UNITED STATES PATENT OFFICE.

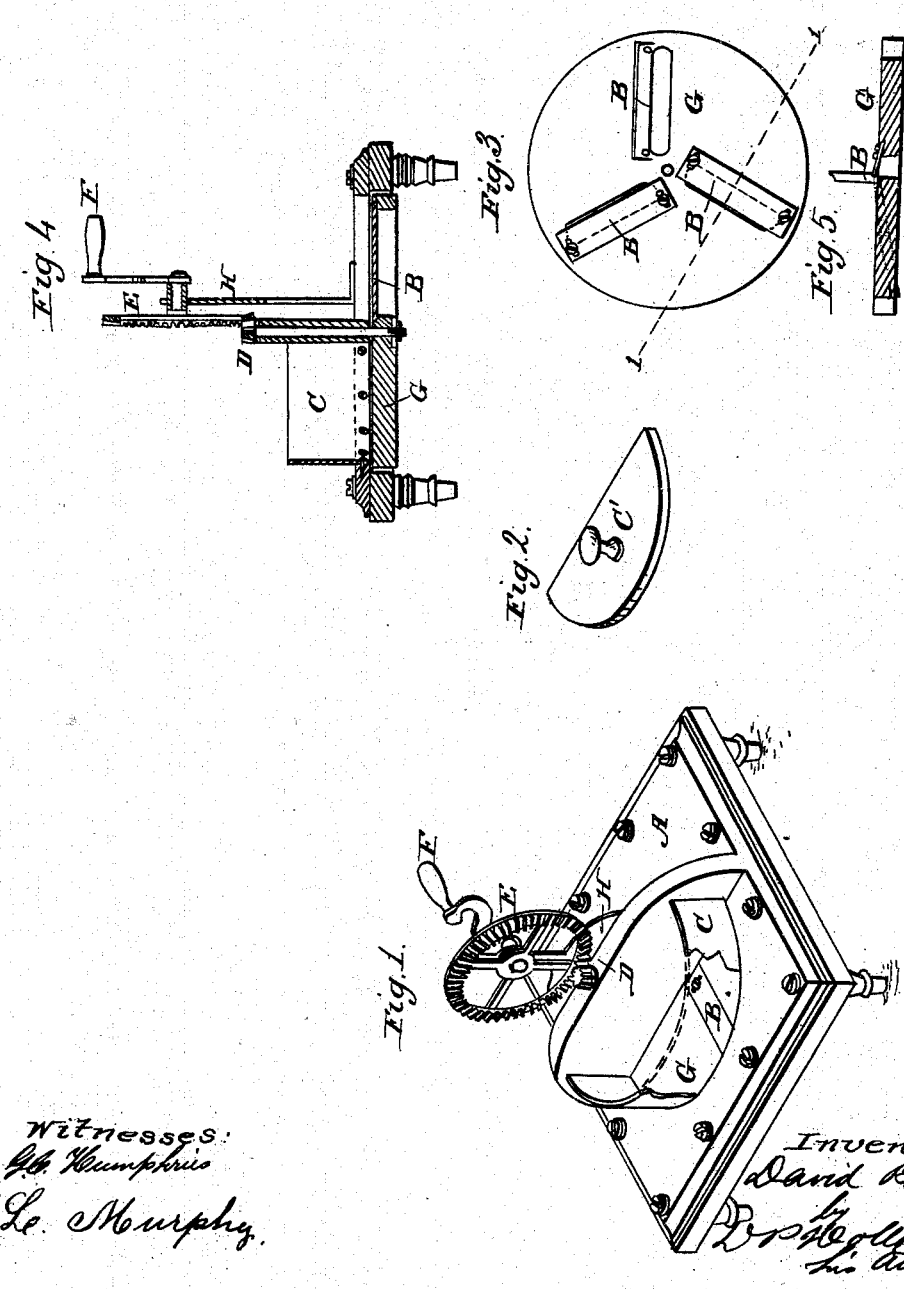

DAVID BEARLY, OF NEW CASTLE, INDIANA.

IMPROVED VEGETABLE-CUTTER.

Specification forming part of Letters Patent No. 57,070, dated August 14, 1866.

*To all whom it may concern:*

Be it known that I, DAVID BEARLY, of New Castle, in the county of Henry and State of Indiana, have invented an Improvement in the Construction of Vegetable-Cutters; and I do hereby declare that the following is a full and exact description of the same, reference being had to the accompanying drawings, made part of this specification, in which—

Figure 1 is an isometrical perspective part of the curb-wing, represented as broken away. Fig. 2 represents a cover used for pressing down the vegetables upon the cutters. Fig. 3 is a plan of the revolving disk carrying the cutters. Fig. 4 is a central vertical section. Fig. 5 is a section of the revolving disk on the line 1 1, Fig. 3.

The machinery is set upon a frame, the board A carrying the revolving disk, except within the curb C. This curb incloses one-half the superficies of the wheel G, and in it is placed the material to be cut, pressed down by the cap C', Fig. 2.

G is a revolving disk, to which are attached the cutters B. These cutters are disposed radially, are slightly inclined upward toward their cutting-edges, are placed over elongated apertures through the disk, of the same length as the knives, and are attached to the disk by set-screws working through slots in the knives, by which the knives are made adjustable. These knives are made of steel, sharpened upon the edges, and the slices cut by the knives pass downward and are discharged through the disk, as above shown. The disk G is hung upon a shaft, which is driven by the bevel-wheels D and E, acted upon by a crank, F, for use by hand, or by pulley and band if driven by power. The gearing is attached to the frame H as shown in the drawings.

Having fully explained the construction and operation of my improved vegetable-cutter, what I claim as my invention, and seek to secure by Letters Patent, is—

The arrangement of a vegetable-cutter having the gearing C D, frame H, curb C, and cover C', with a revolving disk, G, bearing adjustable knives, the several parts being attached, connected, and arranged substantially as set forth.

In testimony whereof I have signed my name to this specification in the presence of two subscribing witnesses.

DAVID BEARLY.

Witnesses:
J. B. MARTINDALE,
A. F. PENTECOST.